United States Patent
Schlecht et al.

(10) Patent No.: US 6,918,543 B2
(45) Date of Patent: Jul. 19, 2005

(54) HEATING SYSTEM FOR A VEHICLE

(75) Inventors: Patric Schlecht, Ostfildern (DE); Jürgen Wagner, Plochingen (DE)

(73) Assignee: J. Ebersdächer GmbH & Co. KG, Esslingen (DE)

( * ) Notice: Subject to any disclaimer, the term of this patent is extended or adjusted under 35 U.S.C. 154(b) by 0 days.

(21) Appl. No.: 10/613,869

(22) Filed: Jul. 5, 2003

(65) Prior Publication Data

US 2004/0065745 A1 Apr. 8, 2004

(30) Foreign Application Priority Data

Jul. 18, 2002 (DE) .......................................... 102 32 685

(51) Int. Cl.⁷ .............................................. B60H 1/02
(52) U.S. Cl. ............................ 237/12.3 A; 237/12.3 R; 165/41; 165/42
(58) Field of Search ...................... 237/12.3 R, 12.3 B, 237/12.3 A, 12.3 C, 8 A; 165/202, 203, 204; 454/75; 236/49.3

(56) References Cited

U.S. PATENT DOCUMENTS

| | | | |
|---|---|---|---|
| 4,448,035 A | * | 5/1984 | Moriyama et al. .......... 62/176.6 |
| 4,506,514 A | * | 3/1985 | Lamar et al. .................. 62/91 |
| 4,852,797 A | | 8/1989 | Goerlich |
| 4,858,677 A | * | 8/1989 | Doi et al. .................... 165/202 |
| 5,518,065 A | * | 5/1996 | Asou et al. ................... 165/43 |
| 6,170,274 B1 | * | 1/2001 | Ichishi et al. ................. 62/179 |
| 6,454,178 B1 | * | 9/2002 | Fusco et al. ............... 236/49.3 |
| 6,659,358 B2 | * | 12/2003 | Kamiya et al. ............ 236/49.3 |

FOREIGN PATENT DOCUMENTS

| | | | |
|---|---|---|---|
| DE | 36 39 172 C2 | 5/1988 | ............ B60H/1/22 |
| DE | 41 15 141 C2 | 3/1993 | ............ B60H/1/00 |

* cited by examiner

Primary Examiner—Derek S. Boles

(57) ABSTRACT

A heating system for a vehicle comprises a heating air fan for producing a heating air flow to be introduced into a vehicle interior, a heating device with a heat exchanger arrangement for heating the heating air flow delivered by the heating air fan, a vehicle interior temperature sensor arrangement for producing an output in connection with the temperature in the vehicle interior, a vehicle interior reference temperature presetting arrangement, a heating air flow temperature sensor arrangement for producing a second output in connection with the outlet temperature of the heating air flow heated by the heating device, and also a control device which is arranged so as to set the delivery capacity of the heating air fan in dependence on the first output and on the vehicle interior reference temperature predetermined by the vehicle interior reference temperature presetting arrangement, and to set the heating capacity of the heating device in dependence on the second output.

4 Claims, 1 Drawing Sheet

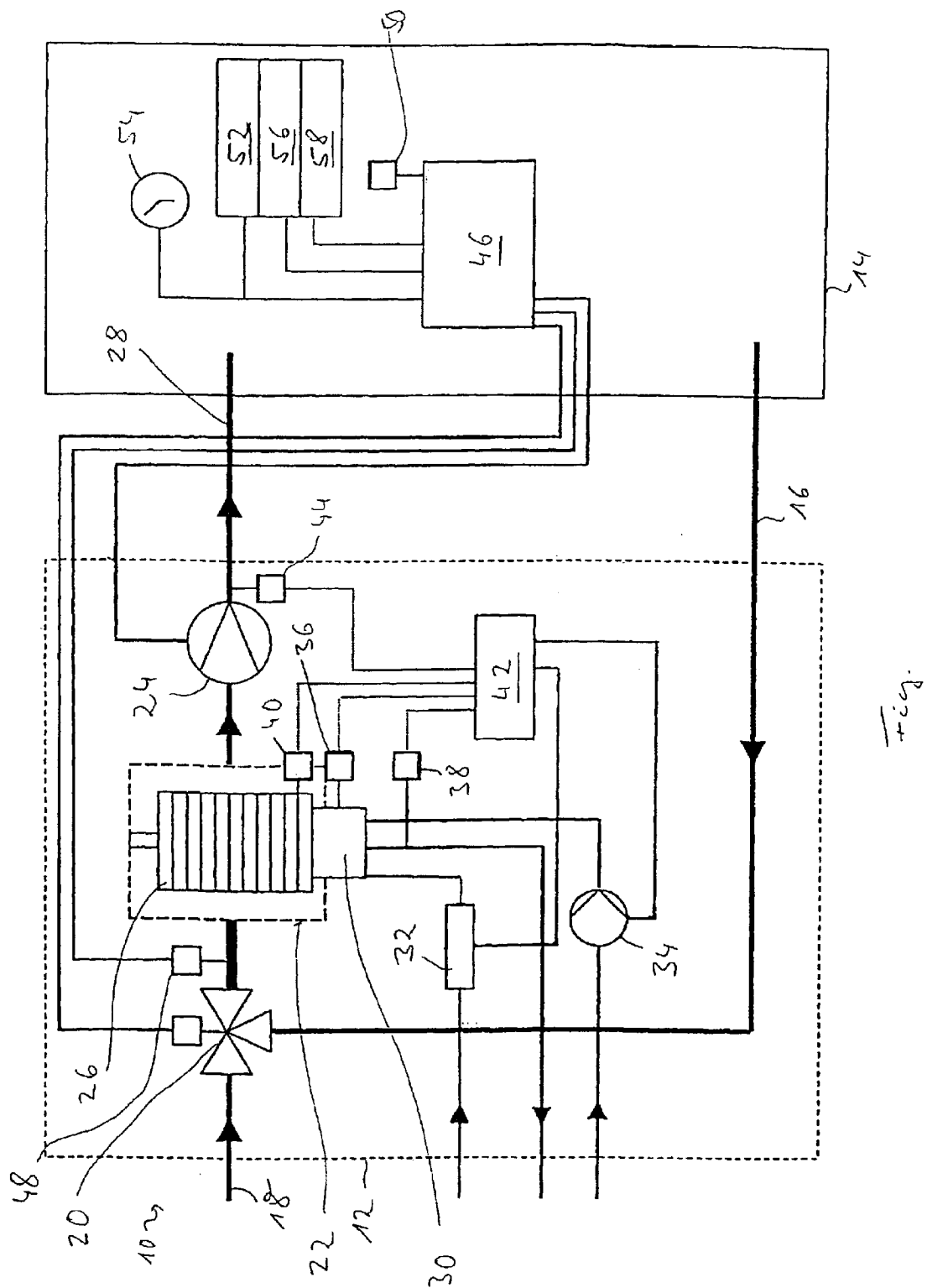

HEATING SYSTEM FOR A VEHICLE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a heating system for a vehicle, including a heating air fan for producing a heating air flow to be introduced into a vehicle interior, and also a heating device with a heat exchange arrangement for heating the heating air flow forwarded by the heating air fan.

TECHNICAL FIELD

The situation often arises in constructing heating systems for vehicles that different system regions are provided by different suppliers, and these different system regions then must be connected together. Thus, for example, the heating device with the associated heat exchanger arrangement can on the one hand represent a self-contained system region, and the heating air fan, possibly combined with an air conditioning arrangement, can represent a further self-contained system region. These two system regions then must be operated in tandem so that the desired operation results: for example, the vehicle interior of a vehicle having the whole system can be brought to the desired temperature as quickly as possible in the auxiliary heating mode or in the supplementary heating mode. Different input quantities, such as, for example, different reference temperatures, are available for the control of the two mentioned system regions, and then have to be further processed so that the desired state is reached as quickly as possible and with the most efficient use of the applied energy.

SUMMARY OF THE INVENTION

The object of the present invention is to provide a vehicle heating system that has an efficient operating characteristic, with a minimum connection of different system regions from a control technology standpoint.

According to the present invention, this object is attained by a heating system for a vehicle, comprising a heating air fan for producing a heating air flow to be introduced into a vehicle interior, a heating device with a heat exchange arrangement for heating the heating air flow delivered by the heating air fan, a vehicle interior temperature sensor arrangement for producing an output related to the temperature in the vehicle interior, a vehicle interior reference temperature presetting arrangement, a heating air flow temperature sensor arrangement for producing a second output relating to the temperature of the heating air flow heated by the heating device, a control arrangement which is constituted so as to set the forwarding capacity of the heating air fan in dependence on the first output and the vehicle interior reference temperature predetermined by the vehicle interior reference temperature presetting arrangement and the heating capacity of the heating device in dependence on the second output.

It is fundamental for the arrangement according to the invention that the two system regions, heating air fan on the one hand and heating device on the other hand, are basically controlled in dependence on different quantities, and a quantity used in a direct fashion in the process of one system is not also used for control in the other system. In this way, the two systems can be largely decoupled, both as regards construction technology and as regards control technology, thus making it possible to provide them as basically also self-sufficiently operating modular regions.

For example, it can be provided that a heating air flow reference output temperature is predetermined, and that the control device controls the heating device in dependence on the second output and the heating air flow reference outlet temperature. In order to be able to obtain here the quickest possible heating of a vehicle interior, it is proposed that the heating air reference outlet temperature is fixedly predetermined in the region of 60° C.–90° C. The heating air flow reference outlet temperature is thus, in the system according to the invention, a quantity which is basically fixedly predetermined or can be predetermined, and which results, for example, from constructional parameters, such as, e.g., the materials used for the channels conducting the heating air flow. It is however basically independent, for example, from the vehicle interior reference temperature. This in its turn means that when on the one hand the heating air flow reference temperature is predetermined and on the other hand the vehicle interior reference temperature is fixedly predetermined, the setting of the vehicle interior reference temperature is influenced by the delivery capacity at which the heating air fan is working. The delivery capacity of the heating air fan, in its turn, indirectly predetermines the heating capacity at which the heating device has to be operated in order to be able to attain the basically fixedly predetermined heating air reference outlet temperature, which forms the essential input quantity for controlling the heating device. A smaller heating air flow requires, at a predetermined inlet temperature of the heating air before entering the heat exchanger arrangement, a smaller heating capacity, and vice versa.

Thus, in the design of a heating system according to the invention, it is basically provided that the delivery capacity of the heating air fan, or a quantity representing this, does not form an input quantity, on which the control of the heating device is to be based, for the control arrangement. According to a further advantageous aspect of the present invention, the result of this is the possibility that the control device comprises a first control device for controlling the heating air fan and a second control device for controlling the heating device, the first control device having the first output and the vehicle interior reference temperature as input quantities, and the second control device having the second output and the heating air reference outlet temperature as input quantities. It can thus be seen that the two system regions, associated with which are control devices which are also arranged as physically mutually separated, operate on the basis of different input quantities and, for example, it is not necessary to also use the delivery capacity of the heating air fan, predetermined by the first control device, as the control basis for the heating capacity of the heating device.

BRIEF DESCRIPTION OF THE DRAWING

The present invention is described in detail hereinafter with reference to the accompanying FIGURE, which is a diagram representing the principle of a heating system according to the invention.

DETAILED DESCRIPTION OF THE INVENTION

The heating system 10 shown in the FIGURE includes as an essential component a conditioning module 12 surrounded by a dashed line. This conditioning module 12 receives air to be brought to the right temperature, on the one hand from a schematically indicated vehicle interior 14, as indicated by a flow arrow 16, and on the other hand from the exterior, as indicated by a flow arrow 18. These two air flows are mixed in a mixer 20 and are conducted to a heating device 22. This takes place under the delivery action of a fan 24 provided downstream of the heating device. An air flow is thus produced flowing through a heat exchanger arrangement 26 of the heating device 22 and, as indicated by a flow arrow 28, entering the vehicle interior.

It should be mentioned regarding the construction of the heating device 22 that this can be of conventional construction and can have a heating burner 30, indicated only schematically, to which fuel to be combusted is supplied by a metering pump 32, and to which the combustion air required for combustion is supplied by a combustion air fan 34. The heating burner 30 can be an atomizing burner or an evaporative burner, and an ignition member 36, for example a glow ignition pin, is associated with the heating burner 30 for igniting it. Furthermore, a flame sensor 38 can be associated with this, while an overheating sensor 40 can be associated with the heat exchanger arrangement 26. The heating device 22 itself, together with the metering pump 32 and the heating air fan 34, is under the control of a control device generally denoted by 42. The glow ignition pin 36 to be activated in the starting phase of the heating device 22 is also under the control of the control device 42. The control device 42 receives, besides the outputs of the already mentioned sensors 38, 40, an output from an outlet temperature sensor 44, which detects the temperature of the air flow after this has flowed through the heat exchanger arrangement 26. It goes without saying that the outlet temperature sensor 44 can also be arranged upstream of the fan 24, or can determine the temperature of the air flow upstream with respect to this fan 24.

A further control device 46 is associated with the fan 24, which means that the fan 24 is operated by the production of corresponding control instructions according to the predetermination of the control device 46. The control device 46, which furthermore can also control the mixer 20 for setting the circulated air/fresh air ratio, receives various input quantities. One of these is an output of a temperature sensor 48 which detects the temperature of the air flow entering the heat exchanger arrangement 26. An interior temperature sensor 50 furthermore inputs its output into the control device 46. A starting preset arrangement 52, for example an operating switch, can produce a signal which indicates to the control device 46 that the heating system 10 is to be operated, for example, in an auxiliary heating mode or a supplementary heating mode. Corresponding information can also be generated by a programmable time switch clock 54. This information representing the starting phase of the heating operation can also be supplied to the control device 42, either directly from the regions 52, 54 or by relaying by the control device 46. The control device 46 furthermore receives from a vehicle interior reference temperature presetting device 56, for example, a temperature selection switch, information regarding the temperature to which the vehicle interior is to be heated or at what temperature it is to be kept. A fresh air/circulated air ratio selection device 58 makes possible the presetting of a given ratio of fresh air to circulated air, or operation, for example, in fresh air mode or in circulated air mode. The arrangements 52, 56, 58 can, for example, be manually actuatable arrangements, but however can also be implemented in the form of a control system region that generates corresponding presets and provides them for the control device 46 as information to be processed, so that, for example, these arrangements can also be a portion of the control device 46 itself.

The operation of the heating system 10 according to the invention and shown in the FIGURE is explained in detail hereinafter for auxiliary heating operation. For this it is assumed that a switch-on instruction is generated, either by the time switch clock 54 or the arrangement 52, i.e. an instruction which signals that the heating operation is to be begun. Since it is to be assumed that the auxiliary heating mode is performed only at comparatively low external temperature, and that the vehicle interior has already been preheated in a certain manner, for example by sunshine, and to the extent that the contained air has a higher temperature than the external air, it can be predetermined by the arrangement 58 that operation is in circulated air mode, which can be changed over in that by means of the mixer 20 either only circulated air withdrawn from the vehicle interior 14 is introduced, or this circulated air is used with the admixture of a small proportion of fresh air, for example 15%, and is conducted to the heat exchanger arrangement 26. Furthermore the arrangement 56 produces a vehicle interior reference temperature which can be situated at +20° C., for example.

The information that auxiliary heating operation has begun, as already mentioned hereinabove, is also conducted to the heating device 42, so that this now sets the heating device 22 in operation by energizing the metering pump 32, the combustion air fan 34, and the glow ignition pin 36. With the setting of the heating device 22 in operation, or for example when it is detected by the flame sensor 38 that the heating burner 30 has ignited and thus the heating device 22 is in a state in which heat of combustion can be transferred in the heat exchanger arrangement 26 to the air flow passing through this, the control device 46 activates the fan 24 in order to generate an air circulation or air flow. The delivery capacity of the fan 24 is here substantially determined by the difference between the vehicle interior reference temperature predetermined by the arrangement 56, and the vehicle interior temperature detected by the sensor arrangement 50. The greater this temperature difference, the greater the delivery capacity of the fan 24 is set, in order to ensure that a relatively large amount of heated air introduced into the vehicle interior 14 can effect the quickest possible heating of the vehicle interior 14, i.e., the quickest possible approach of the actual temperature detected by the sensor arrangement 50 to the vehicle interior reference temperature.

A value is predetermined in the control device 42 for the reference temperature of the air flow leaving the heat exchanger arrangement 26. This value, e.g. fixedly and invariably predetermined, is chosen so that the air leaving the heat exchanger arrangement 26 and flowing into a duct system generally constructed of plastic material cannot lead to thermally-induced deformations of various plastic components. It may be assumed, for example, that this reference temperature is at 65° C. However, a temperature in the region of up to 80° C. is sought here. The heating device 42 compares this reference temperature with the actual temperature of the air flow determined by the sensor arrangement 44 and, according to the result of the comparison, changes the amount of heat energy liberated by combustion in the heating burner 30, and consequently the heating capacity of the heating device 22. The heating capacity required to reach this fixedly predetermined reference temperature is essentially dependent on the inlet temperature at which the air enters the heat exchanger arrangement 26, and on the air mass flow which passes through the heat exchanger arrangement 26. The more air passes through this heat exchanger arrangement 26, the more heat energy has to be provided by means of the heating burner 30 in order to reach the desired reference temperature, for example in the region of 65° C., at the outlet region or for introduction into the vehicle interior space 14. However, it follows from this that, although the heating device 46 controlling the fan 24 has no direct effect on the operation of the heating device 22, since no corresponding control connection exists, the delivery capacity predetermined for the fan 24 by the control device 46 will have an effect on the temperature of the air leaving the heat exchanger arrangement 26, and to this extent the control device 42, according to the detection of this temperature, will pass this on in a corresponding manner to the heating capacity of the heating device 22 or of its burner 30, for example, by increasing the delivery capacity of the fan 24. To this extent there exists between the control characteristic of the control device 46 and the control characteristic of the control device 42 a close relationship for the two system regions operated by these control devices, although due to a corresponding predetermination of control quantities, neither of these control devices performs a control function in the other system region. This makes it possible to integrate the heating device 22 with the control device 42 associated therewith, and of course also the metering pump 32 and the combustion air fan 34, as a substantially independently constructed and also self-sufficiently operating system region into an overall system. Changes of control technology in the region of the control device 45 for the fan 24 are thereby not necessary.

It should be mentioned that in addition to the aforementioned input quantities which are basic for the control of the different system regions, respectively including measurement quantities on the one hand and either fixedly predetermined or variably predeterminable reference values on the other hand, additional information, such as e.g. the temperature of the air entering the heat exchanger arrangement 26, detected by the sensor arrangement 48, can of course be made use of in the different control device 42 or 46, as can further external parameters likewise, such as external air temperature, external air pressure and the like. It goes without saying that the system shown in the FIGURE can include still further regions, such as e.g. an air conditioning unit associated with the fan 24, which can then also be controlled by the control device 46. It is of course also possible, for example, to arrange the fan 24 upstream with respect to the heat exchanger arrangement 26.

We claim:
1. Heating system for a vehicle, comprising:
   a heating air fan (24) for producing a heating air flow to be introduced into a vehicle interior (14),
   a heating device (22) with a heat exchanger arrangement (26) for heating the heating air flow delivered by the heating air fan (24),
   a vehicle interior temperature sensor arrangement (50) for producing an output in dependence on the temperature in the vehicle interior (14),
   a vehicle interior reference temperature predetermining arrangement (56),
   a heating air flow temperature sensor arrangement (44) for producing a second output connection with the outlet temperature of the heating air flow heated by the heating device (22),
   a control device (42, 46) which is arranged to set the delivery capacity of the heating fan (24) in dependence on the first output and on the vehicle interior reference temperature predetermined by the vehicle interior reference temperature arrangement (56), and to set the heating capacity of the heating device (22) in dependence on the second output,
   wherein the delivery capacity of the heating air fan (24), or a quantity representing the delivery capacity of the heating air fan, does not form an input quantity, on which the control of the heating device (22) is to be based for the control device (42, 46).
2. Heating system according to claim 1, wherein a heating air flow reference outlet temperature is predetermined, and wherein the control device (42, 46) controls the heating device (22) in dependence on the second output d the heating air reference outlet temperature.
3. Heating system according to claim 2, wherein the heating air flow reference outlet temperature is fixedly predetermined in the region of 60° C.–90° C.
4. Heating system according to claim 1, wherein the control device (42, 46) comprises a first control device (46) for the control of the heating air fan (24) and a second control device (42) for control of the heating device (22), the first control device (46) having the first output and the vehicle interior reference temperature as input quantities, and the second control device (42) has the second output and the heating air reference outlet temperature as input quantities.

* * * * *